(No Model.)

J. W. SWAN.
SECONDARY BATTERY.

No. 312,599. Patented Feb. 17, 1885.

Witnesses:
Philip Mauro
C. J. Hedrick

Inventor:
Joseph Wilson Swan
by A. Pollok
his attorney.

UNITED STATES PATENT OFFICE.

JOSEPH WILSON SWAN, OF NEWCASTLE-UPON-TYNE, COUNTY OF NORTH-UMBERLAND, ASSIGNOR TO THE ELECTRICAL POWER STORAGE COMPANY, LIMITED, OF LONDON, ENGLAND.

SECONDARY BATTERY.

SPECIFICATION forming part of Letters Patent No. 312,599, dated February 17, 1885.

Application filed January 18, 1882. (No model.) Patented in England May 24, 1881, No. 2,272.

*To all whom it may concern:*

Be it known that I, JOSEPH WILSON SWAN, a subject of the Queen of Great Britain, and residing at Newcastle-upon-Tyne, in the county of Northumberland, England, have invented certain Improvements in Secondary Batteries or Apparatus for Storing or Conserving Electricity, (for which I have obtained a patent in Great Britain, No. 2,272, dated May 24, 1881,) of which the following is a specification.

My said invention has for its object facilitating the construction of so-called "secondary voltaic piles or batteries," and aims at the production of plates having surfaces more suitable for holding the active material, such as spongy lead or lead in a finely divided form.

In carrying out my said invention I prepare plates with perforations, cells, or holes extending through the plates, and pack the active material, or material to become active, in the perforations or cells.

Figure 1:
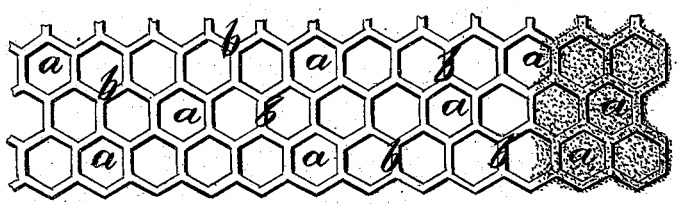
Figure 2:

The accompanying drawings illustrate, by way of example, a plate constructed according to my said invention, Figures 1 and 2 being respectively a front elevation and transverse vertical section.

The plate is constructed with cells or cavities *a*, which extend through the plate and in which the active material, such as spongy or finely-divided lead or the material to become active is packed. The outer surface of the walls *b* of the cells may be covered or coated with the spongy or finely-divided lead.

It should be understood that the form of the cells may be greatly varied without departing from the principal of my said invention, the object being to obtain an interstitial construction of plate capable of affording a very large amount of acting surface in a small compass, and to prevent the coating of oxide or spongy lead from falling away from the plate, as it would from a plain vertical surface, unless held in position by some material external to the said coating.

When intended for use, a pair or a series of these plates may be placed in a suitable vessel and arranged and charged after the well-known manner of arranging and charging secondary piles or batteries, so as to act as a means for conserving or storing energy.

Having now described and particularly ascertained the nature of my said invention and the manner in which the same is or may be used or carried into effect, what I claim is—

A perforated or cellular plate for secondary batteries having the perforations or cells extending through the plate and the active material, or material to become active, packed in the said perforations or cells, substantially as described.

In testimony whereof I have signed my name to this specification in the presence of two subscribing witnesses.

JOSEPH WILSON SWAN.

Witnesses:
 CHAS. MILLS,
 JOHN JAMES,
*Both of 47 Lincoln's Inn Fields, London.*